(12) United States Patent
Nakao

(10) Patent No.: US 10,027,156 B2
(45) Date of Patent: Jul. 17, 2018

(54) ELECTRONIC APPARATUS AND CHARGING METHOD

(71) Applicant: KYOCERA Corporation, Kyoto (JP)

(72) Inventor: Masaki Nakao, Daito (JP)

(73) Assignee: KYOCERA Corporation, Kyoto (JP)

( * ) Notice: Subject to any disclaimer, the term of this patent is extended or adjusted under 35 U.S.C. 154(b) by 205 days.

(21) Appl. No.: 14/945,227

(22) Filed: Nov. 18, 2015

(65) Prior Publication Data

US 2016/0156216 A1 Jun. 2, 2016

(30) Foreign Application Priority Data

Nov. 27, 2014 (JP) .................................. 2014-240570

(51) Int. Cl.
*H02J 7/00* (2006.01)
*H02J 7/02* (2016.01)
*H02J 50/10* (2016.01)
*H02J 50/90* (2016.01)

(52) U.S. Cl.
CPC ............ *H02J 7/025* (2013.01); *H02J 7/0055* (2013.01); *H02J 50/10* (2016.02); *H02J 50/90* (2016.02); *H02J 7/0077* (2013.01)

(58) Field of Classification Search
USPC .................................. 320/108, 161, 162, 141
See application file for complete search history.

(56) References Cited

U.S. PATENT DOCUMENTS 8,325,051 B2  12/2012  Masuda
8,400,105 B2 *  3/2013  Kondo .............. H01M 10/4257
                                                    320/106
9,287,720 B2 *  3/2016  Kawamura ........... B60L 11/182
(Continued)

FOREIGN PATENT DOCUMENTS

JP       2008-131812 A      6/2008
JP       2009-273305 A     11/2009
(Continued)

OTHER PUBLICATIONS

Office Action dated Nov. 29, 2016 by Japanese Patent Office in corresponding Japanese Patent Application No. 2014-240570.

*Primary Examiner* — Brian Ngo
(74) *Attorney, Agent, or Firm* — Procopio Cory Hargreaves and Savitch LLP

(57) ABSTRACT

An electronic apparatus and a charging method are disclosed. An electronic apparatus comprises a battery, a charge processing module, a setting module, and a determination module. The charge processing module includes a power reception coil, a generation module, and a charging module. The generation module generates a DC voltage based on the electric power received by the power reception coil. The charging module charges the battery based on the DC voltage when the DC voltage supplied from the generation module is equal to or greater than a first threshold or is greater than the first threshold, and does not charge the battery when the DC voltage is equal to or smaller than a second threshold or is smaller than the second threshold. The setting module reduces a charging current when the determination module determines that the battery is not continuously charged after the charging module starts charging the battery.

7 Claims, 9 Drawing Sheets

(56) References Cited

U.S. PATENT DOCUMENTS

| | | | |
|---|---|---|---|
| 2008/0197811 A1* | 8/2008 | Hartular | H01M 10/44 320/141 |
| 2008/0278119 A1* | 11/2008 | Veselic | H02J 7/0022 320/161 |
| 2011/0006905 A1 | 1/2011 | Masuda | |
| 2012/0313579 A1* | 12/2012 | Matsumoto | H02J 7/025 320/108 |
| 2013/0154554 A1* | 6/2013 | Sakai | H02J 7/025 320/108 |
| 2013/0162206 A1* | 6/2013 | Takeuchi | H02J 7/025 320/108 |
| 2014/0300317 A1 | 10/2014 | Kim | |
| 2014/0361736 A1* | 12/2014 | Kwon | H02J 5/005 320/108 |
| 2015/0042267 A1* | 2/2015 | Wang | H02J 7/0052 320/108 |
| 2015/0311735 A1* | 10/2015 | Shimada | H02J 7/0052 320/107 |

FOREIGN PATENT DOCUMENTS

| | | |
|---|---|---|
| JP | 5277711 B2 | 11/2009 |
| JP | H1-138929 A | 11/2009 |
| JP | 2011-019315 A | 1/2011 |
| JP | 2014-534801 A | 12/2014 |
| WO | 2009/136483 A1 | 11/2009 |
| WO | 2013/062253 A1 | 5/2013 |

\* cited by examiner

F I G . 1
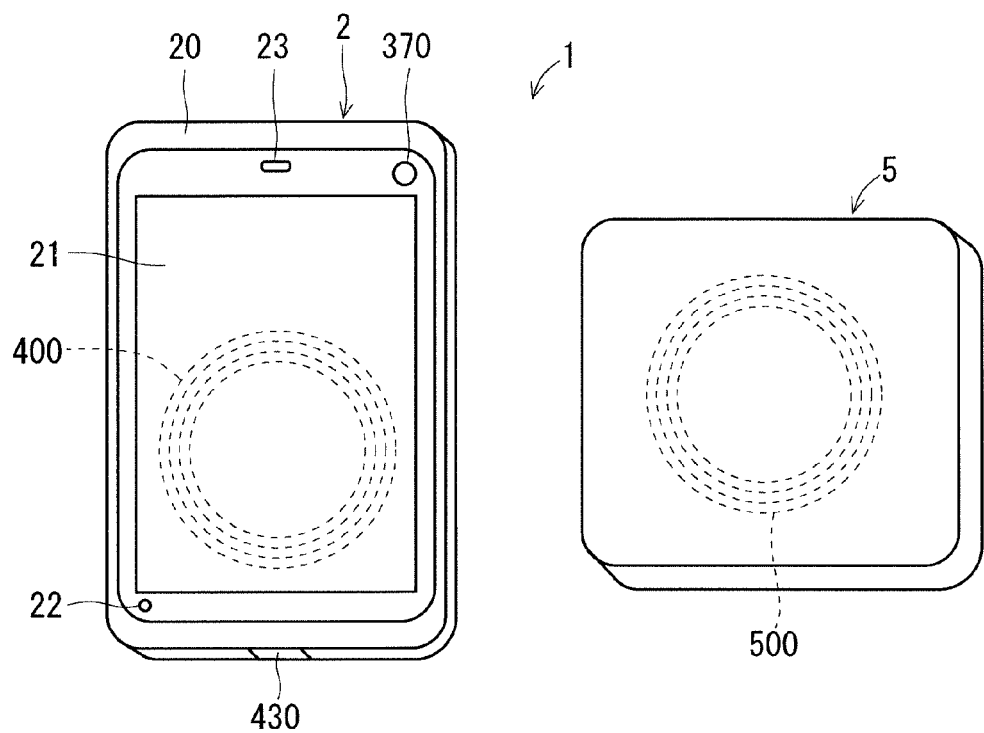
F I G . 2
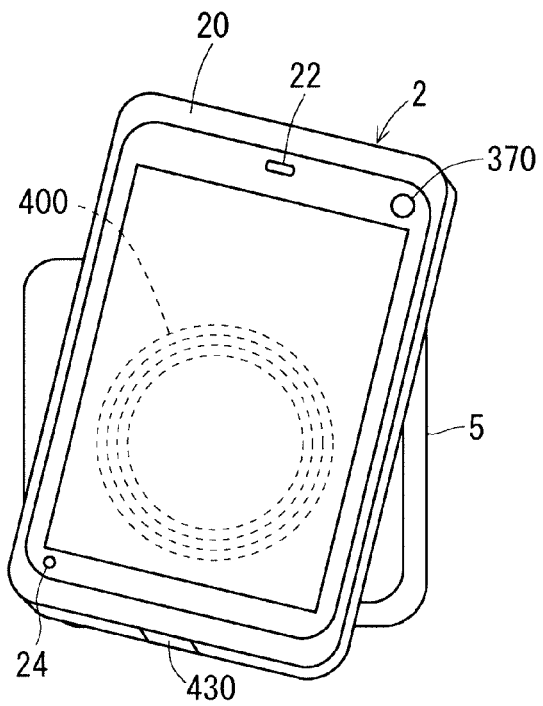

F I G . 3
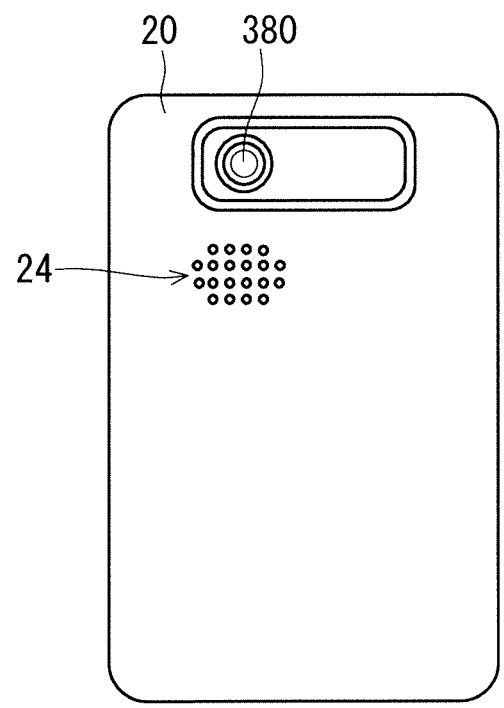

F I G . 4
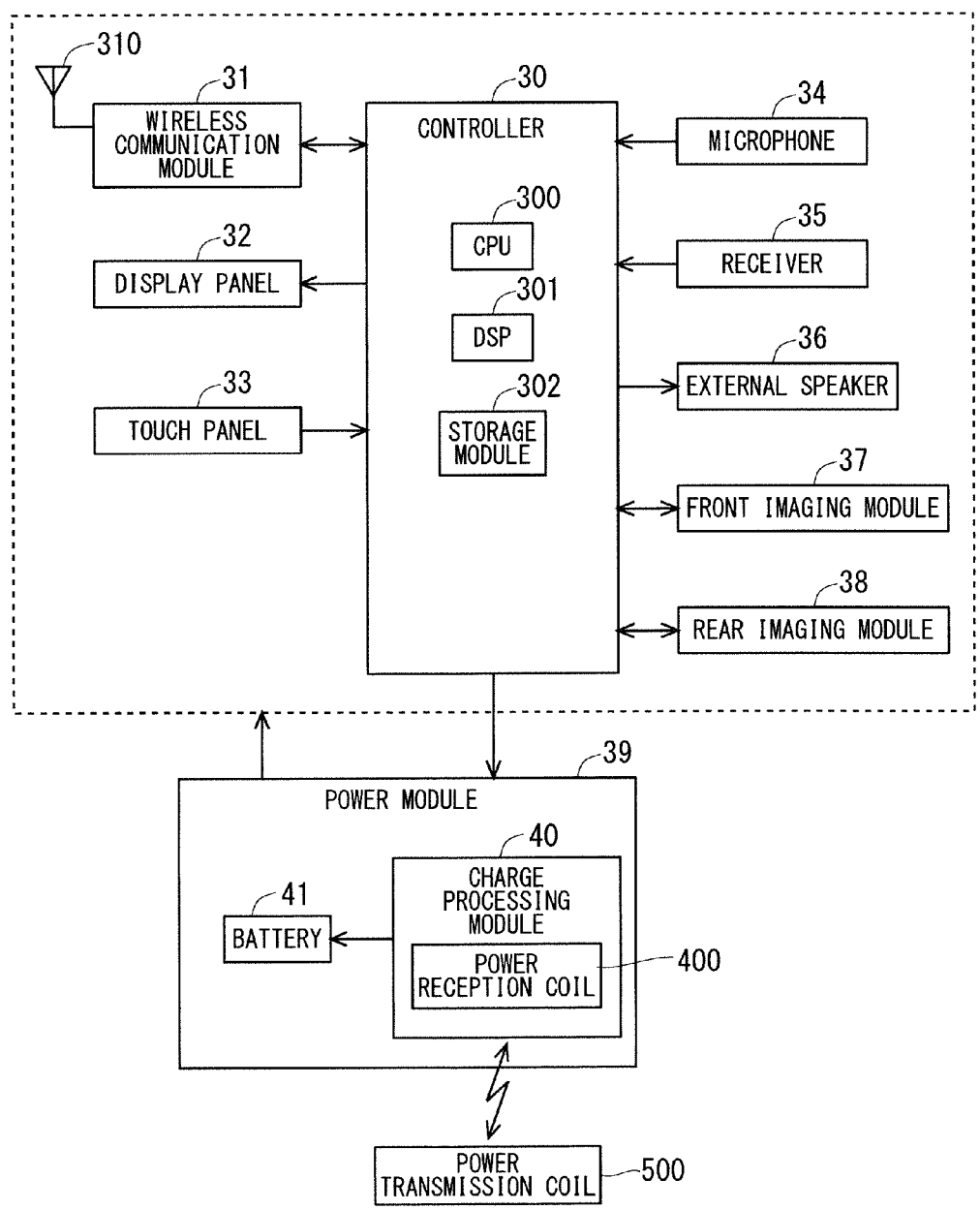

F I G . 8
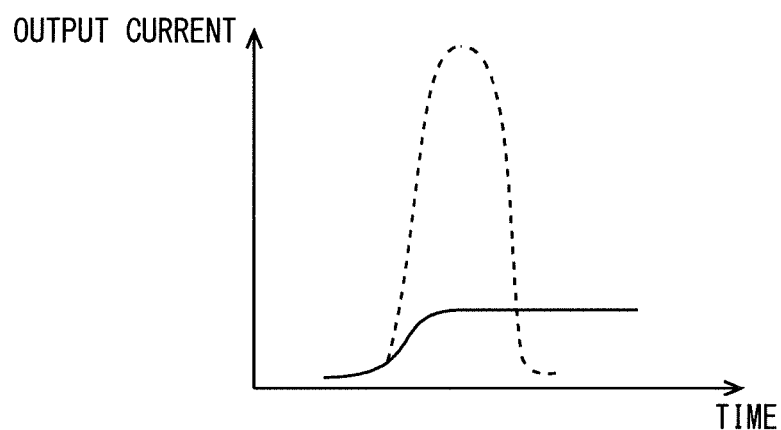
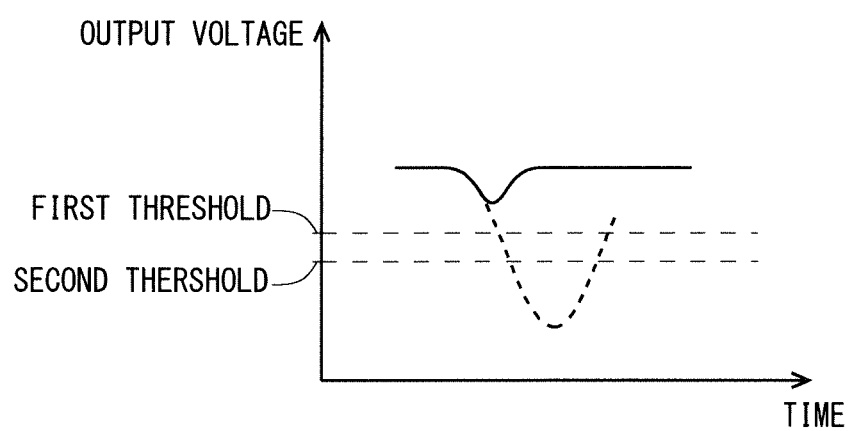

F I G . 9
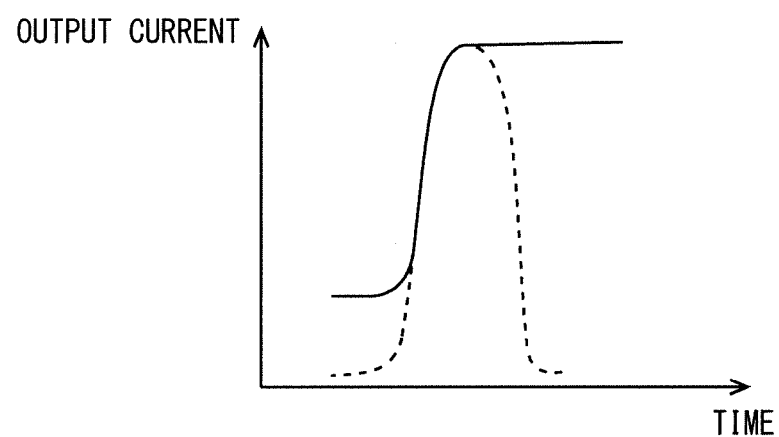
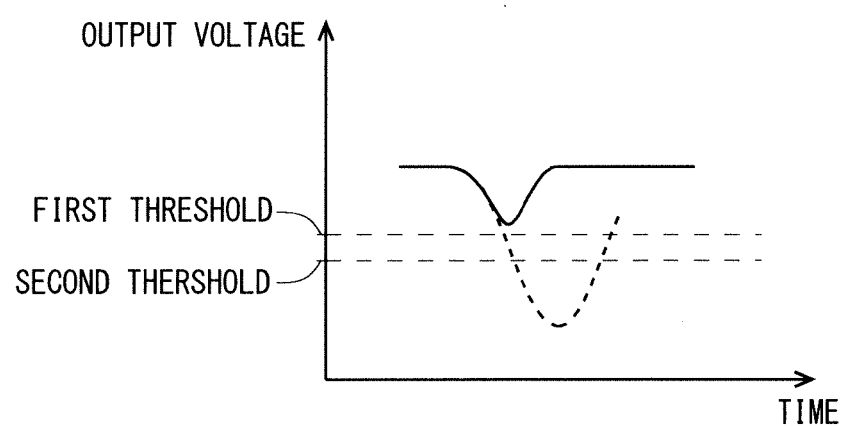

ELECTRONIC APPARATUS AND CHARGING METHOD

CROSS-REFERENCE TO RELATED APPLICATION

The present application claims priority under 35 U.S.C. § 119 to Japanese Patent Application No. 2014-240570, filed on Nov. 27, 2014, entitled "ELECTRONIC APPARATUS AND CHARGING METHOD". The content of which is incorporated by reference herein in its entirety.

FIELD

Embodiments of the present disclosure relate to charging of a battery in an electronic apparatus.

BACKGROUND

Various techniques have traditionally been proposed in relation to charging of a battery in an electronic apparatus.

SUMMARY

An electronic apparatus and a charging method are disclosed. In one embodiment, an electronic apparatus comprises a battery, a charge processing module, a setting module, and a determination module. The charge processing module charges the battery on the basis of electric power transmitted contactlessly from a contactless charging device. The setting module sets a charging current to be supplied to the battery by the charge processing module. The determination module determines whether the battery is continuously charged. The charge processing module includes a power reception coil, a generation module, and a charging module. The power reception coil receives electric power supplied from a power transmission coil of the contactless charging device. The generation module generates a DC voltage on the basis of the electric power received by the power reception coil. The charging module charges the battery on the basis of the DC voltage when the DC voltage supplied from the generation module is equal to or greater than a first threshold or is greater than the first threshold, and does not charge the battery when the DC voltage is equal to or smaller than a second threshold or is smaller than the second threshold. The setting module reduces the charging current when the determination module determines that the battery is not continuously charged after the charging module starts charging the battery.

In one embodiment, a charging method is a method of charging, by an electronic apparatus including a battery, the battery on the basis of electric power transmitted contactlessly from a contactless charging device. The charging method comprises: receiving, by a power reception coil of the electronic apparatus, electric power from a power transmission coil of the contactless charging device; generating a DC voltage on the basis of the electric power received by the power reception coil; charging the battery on the basis of the DC voltage when the DC voltage is equal to or greater than a first threshold or is greater than the first threshold; not charging the battery when the DC voltage is equal to or smaller than a second threshold or is smaller than the second threshold; and determining whether the battery is continuously charged. A charging current to be supplied to the battery is reduced when it is determined that the battery is not continuously charged after a start of charging the battery.

BRIEF DESCRIPTION OF THE DRAWINGS

FIG. 1 illustrates a configuration of an electronic apparatus system.

FIG. 2 illustrates a state in which an electronic apparatus is mounted on a contactless charging device.

FIG. 3 illustrates a rear view of an external appearance of the electronic apparatus.

FIG. 4 illustrates an electrical configuration of the electronic apparatus.

FIG. 8 illustrates an output current and an output voltage of a DC voltage generation module.

FIG. 9 illustrates an output current and an output voltage of the DC voltage generation module.

DETAILED DESCRIPTION

<Overall Configuration of Electronic Apparatus System>

Figure 5:
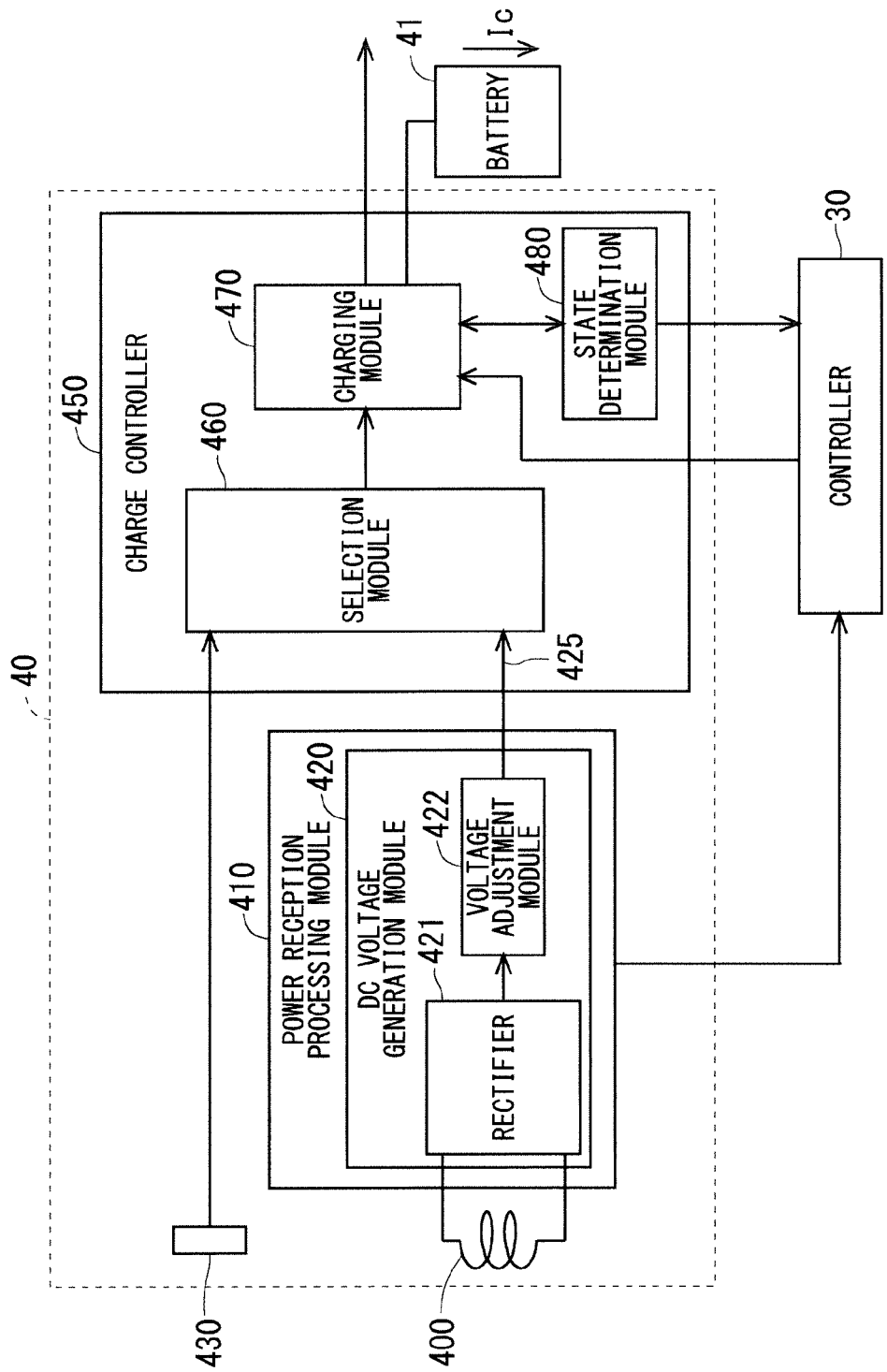
FIG. 5 illustrates a configuration of a charge processing module.

FIG. 1 illustrates a configuration of an electronic apparatus system 1. As illustrated in FIG. 1, the electronic apparatus system 1 includes an electronic apparatus 2 and a contactless charging device 5 that performs contactless charging of the electronic apparatus 2. The electronic apparatus 2 is, for example, a mobile phone such as a smartphone. The electronic apparatus 2 can communicate with another communication apparatus via a base station, server, and the like. Contactless charging is also referred to as "wireless charging" or "non-contact charging."

Inside the contactless charging device 5 is provided a power transmission coil 500 that can transfer electric power to the electronic apparatus 2. Inside the electronic apparatus 2 is provided a power reception coil 400 that can receive the electric power supplied from the power transmission coil 500. A battery of the electronic apparatus 2 is charged on the basis of the electric power received by the power reception coil 400. As illustrated in FIG. 2, the electronic apparatus 2 is charged by the contactless charging device 5 while being placed on the contactless charging device 5. The contactless charging device 5 is also referred to as a "charging stand." Hereinafter, the contactless charging device 5 is merely referred to as a "charging device 5."

Although FIGS. 1 and 2 illustrate the charging device 5 capable of mounting one electronic apparatus 2 thereon, some charging devices 5 can mount a plurality of electronic apparatuses 2 thereon. Such a charging device 5 can charge a plurality of electronic apparatuses 2 at the same time. Besides, the charging device 5 can charge not only batteries of mobile phones such as smartphones but also batteries of other types of electronic apparatuses.

Contactless charging of the electronic apparatus 2 by the charging device 5 is performed in conformity with, for example, the standard referred to as Qi. Qi is the international standard developed by the WPC (Wireless Power Consortium). Contactless charging of the electronic apparatus 2 by the charging device 5 may conform to other standards, such as the standard defined by the PMA (Power Matters Alliance).

<External Appearance of Electronic Apparatus>

FIG. 3 illustrates a rear view of an external appearance of the electronic apparatus 2. As illustrated in FIGS. 1 to 3, the electronic apparatus 2 includes a plate-shaped apparatus case 20 having a substantially rectangular plate shape in plan view. A front surface of the apparatus case 20 is provided with a display area 21 in which various types of information such as characters, symbols, and diagrams appear. Attached to a rear surface of the display area 21 is a touch panel 33 described below. A user can provide various instructions to the electronic apparatus 2 by manipulating the display area 21 of the front surface of the electronic apparatus 2 with a finger or the like. Also, the user can provide various instructions to the electronic apparatus 2 by manipulating the display area 21 with a manipulator other than a finger, for example, a pen for an electrostatic touch panel such as a stylus pen.

At a lower end and an upper end of the front surface of the apparatus case 20, a microphone hole 22 and a receiver hole 23 are respectively provided. Through the upper end of the front surface of the apparatus case 20, an imaging lens 370 of a front imaging module 37 described below is visually recognizable. On a lower lateral surface of the apparatus case 20 is provided a charging connector 430. For example, a USB (Universal Serial Bus) cable is connected to the charging connector 430. The charging connector 430 is supplied with the external power through the USB cable. The electronic apparatus 2 can charge the battery not only by the electric power supplied from the charging device 5 but also by the external power supplied to the charging connector 430.

As illustrated in FIG. 3, on the rear surface of the apparatus case 20 is provided a speaker hole 24. Through the rear surface of the apparatus case 20, an imaging lens 380 of a rear imaging module 38 described below is visually recognizable.

<Electrical Configuration of Electronic Apparatus>

FIG. 4 illustrates a block diagram of an electrical configuration of the electronic apparatus 2. As illustrated in FIG. 4, the electronic apparatus 2 includes a controller 30, a wireless communication module 31, a display panel 32, the touch panel 33, a microphone 34, and a receiver 35. The electronic apparatus 2 further includes an external speaker 36, the front imaging module 37, the rear imaging module 38, and a power module 39. The apparatus case 20 houses these components of the electronic apparatus 2.

The controller 30 includes a CPU (Central Processing Unit) 300, a DSP (Digital Signal Processor) 301, and a storage module 302. The controller 30 can control other components of the electronic apparatus 2 to manage the operation of the electronic apparatus 2 in a supervising manner.

The storage module 302 is formed of a non-transitory recording medium that can be read by the controller 30 (the CPU 300 and the DSP 301), such as a ROM (Read Only Memory) and a RAM (Random Access Memory). The storage module 302 stores a main program that is a control program for controlling the operation of the electronic apparatus 2, specifically, the components such as the wireless communication module 31 and the display panel 32 of the electronic apparatus 2, an application program, and the like. The CPU 300 and the DSP 301 execute the various programs in the storage module 302, so that the functions of the controller 30 are executed. The storage module 302 may include a non-transitory, computer-readable recording medium other than the ROM and the RAM. The storage module 302 may include, for example, a small hard disk drive and an SSD (Solid State Drive).

The wireless communication module 31 has an antenna 310. The wireless communication module 31 can receive, by the antenna 310, a signal from another mobile phone different from the electronic apparatus 2 or a communication apparatus such as a web server connected to the Internet via, for example, a base station. The wireless communication module 31 can amplify and down-convert a received signal and then output a resultant signal to the controller 30. The controller 30 can, for example, demodulate a received signal to be input thereto, thereby acquiring a sound signal indicative of voice, music, or the like included in the received signal. The wireless communication module 31 can up-convert and amplify a transmission signal that is generated in the controller 30 and includes a sound signal, thereby wirelessly transmitting a resultant transmission signal from the antenna 310. The transmission signal from the antenna 310 is received by the mobile phone different from the electronic apparatus 2 or the communication apparatus connected to the Internet via, for example, the base station.

The display panel 32 is, for example, a liquid crystal display panel or an organic EL (electroluminescent) panel. The display panel 32 is controlled by the controller 30 and can accordingly display various types of information such as characters, symbols, and diagrams. The display panel 32 is disposed to face the display area 21 in the apparatus case 20. The information displayed on the display panel 32 appears in the display area 21 of the apparatus case 20.

The touch panel 33 can detect a manipulation on the display area 21 of the apparatus case 20 with a manipulator such as a finger. The touch panel 33 is, for example, a projected capacitive touch panel and is attached to the rear surface of the display area 21. When the user manipulates the display area 21 with the manipulator such as a finger, an electrical signal corresponding to the manipulation is input from the touch panel 33 to the controller 30. The controller 30 identifies the contents of the manipulation performed on the display area 21 on the basis of the electrical signal from the touch panel 33, thereby performing the processing corresponding to the contents.

The microphone 34 can convert a sound from the outside of the electronic apparatus 2 into an electrical sound signal and then output the sound signal to the controller 30. The sound from the outside of the electronic apparatus 2 is taken into the electronic apparatus 2 through the microphone hole 22 and is then input to the microphone 34.

The external speaker 36 is, for example, a dynamic speaker. The external speaker 36 can convert an electrical sound signal from the controller 30 into a sound and then output the sound. The sound output from the external speaker 36 is output to the outside through the speaker hole 24. The sound output through the speaker hole 24 can be heard at a place apart from the electronic apparatus 2.

The front imaging module 37 is mainly composed of the imaging lens 370 and an image sensor. The front imaging module 37 can capture a static image and a moving image on the basis of the control by the controller 30. The rear imaging module 38 is mainly composed of the imaging lens 380 and an image sensor. The rear imaging module 38 can capture a static image and a moving image on the basis of the control by the controller 30.

The receiver 35 can output a received sound. The receiver 35 is formed of, for example, a dynamic speaker. The receiver 35 can convert an electrical sound signal from the controller 30 into a sound and then output the sound. The sound output from the receiver 35 is output to the outside through the receiver hole 23. The volume of the sound output through the receiver hole 23 is lower than the volume of the sound output through the speaker hole 24.

The power module 39 can output the power for the electronic apparatus 2. The power output from the power module 39 is supplied to the electronic components included in the controller 30 and the wireless communication module 31 of the electronic apparatus 2. The power module 39 includes a battery 41 and a charge processing module 40 that can charge the battery 41. The power module 39 can output the electric power from the battery 41 as the power for the electronic apparatus 2. The power module 39 can also output the electric power supplied from the outside of the electronic apparatus 2 as the power for the electronic apparatus 2. The electric power supplied from the outside of the electronic apparatus 2 includes the electric power from the charging device 5 and the external power supplied to the charging connector 430.

The power reception coil 400 and the charging connector 430 are provided in the charge processing module 40. The charge processing module 40 can charge the battery 41 on the basis of the electric power from the power transmission coil 500 of the charging device 5, which is received by the power reception coil 400, or the external power supplied to the charging connector 430.

<Configuration of Charge Processing Module>

FIG. 5 illustrates the configuration of the charge processing module 40. As illustrated in FIG. 5, the charge processing module 40 includes the power reception coil 400, a power reception processing module 410, the charging connector 430, and a charge controller 450.

The power reception processing module 410 includes a DC voltage generation module 420 that can generate and output a DC voltage 425 on the basis of the electric power received by the power reception coil 400. The DC voltage generation module 420 includes a rectifier 421 and a voltage adjustment module 422. The rectifier 421 can rectify the electric power generated in the power reception coil 400 to generate a DC voltage. The voltage adjustment module 422 can lower the DC voltage generated in the rectifier 421 to generate the DC voltage 425. The power reception processing module 410 can communicate with the charging device 5 on the basis of the Qi-based communication scheme using the power reception coil 400.

The charge controller 450 can control charging of the battery 41. The charge controller 450 can charge the battery 41 on the basis of any one of the DC voltage 425 output from the DC voltage generation module 420 and the external power supplied to the charging connector 430. The charge controller 450 includes a selection module 460, a charging module 470, and a state determination module 480.

The selection module 460 can select any one of the DC voltage 425 output from the DC voltage generation module 420 and the external power (external voltage) supplied to the charging connector 430 and then output the selected one to the charging module 470. Specifically, when being supplied with the DC voltage 425 from the DC voltage generation module 420 and not being supplied with the external power from the charging connector 430, the selection module 460 can output the DC voltage 425 to the charging module 470. When not being supplied with the DC voltage 425 from the DC voltage generation module 420 and being supplied with the external power from the charging connector 430, the selection module 460 can output the external power from the charging connector 430 to the charging module 470. When being supplied with the DC voltage 425 from the DC voltage generation module 420 and also being supplied with the external power from the charging connector 430, the selection module 460 can output, for example, the external power from the charging connector 430 to the charging module 470.

When the selection module 460 outputs the DC voltage 425 output from the DC voltage generation module 420, the charging module 470 can charge the battery 41 on the basis of the DC voltage 425. Meanwhile, when the selection module 460 outputs the external power supplied to the charging connector 430, the charging module 470 can charge the battery 41 on the basis of the external power. The controller 30 sets a charging current Ic to be supplied to the battery 41 by the charging module 470.

The state determination module 480 can determine the charging state of the battery 41. The state determination module 480 can determine, for example, whether the battery 41 is being charged, whether the battery 41 is being discharged, or whether the battery 41 is fully charged. The state determination module 480 can notify the controller 30 of the determined charging state of the battery 41 in response to a request from the controller 30. The charging state of the battery 41 can be determined on the basis of the operation status of the charging module 470, the voltage of the battery 41, and the like.

<Transmission of Electric Power from Power Transmission Coil to Power Reception Coil>

Figure 6:
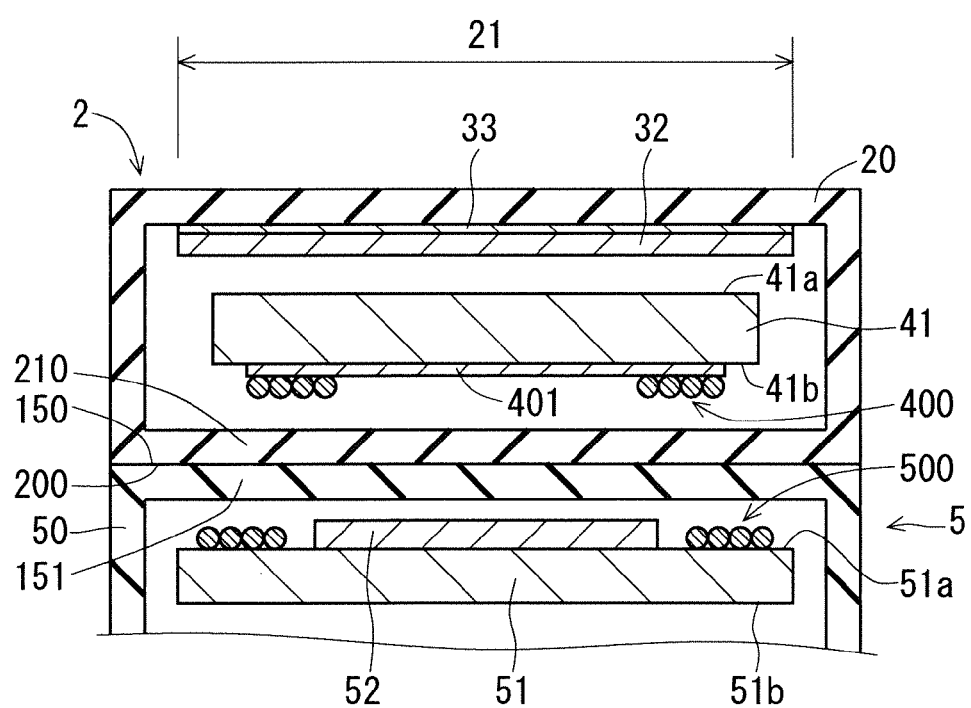
FIG. 6 illustrates cross-sectional structures of the electronic apparatus and the contactless charging device.

The following describes the transmission of the electric power from the power transmission coil 500 to the power reception coil 400 in detail. FIG. 6 schematically illustrates the cross-sectional structures of the charging device 5 and the electronic apparatus 2 mounted on the charging device 5.

The power reception coil 400 and the power transmission coil 500 are each formed of a wound wire. The power reception coil 400 is disposed substantially perpendicular to a rear surface 200 of the apparatus case 20 of the electronic apparatus 2 (a contact surface of the apparatus case 20 with the charging device 5). The power transmission coil 500 is disposed substantially perpendicular to a mounting surface 150 of a case 50 of the charging device 5, on which the electronic apparatus 2 is mounted.

In the apparatus case 20 of the electronic apparatus 2, the battery 41 is disposed to face the display panel 32. The battery 41 has a first main surface 41a that faces the display panel 32 and a second main surface 41b opposite the first main surface 41a. The power reception coil 400 is attached to a magnetic sheet 401, and the magnetic sheet 401 is mounted on the second main surface 41b of the battery 41. In other words, the power reception coil 400 is mounted on the second main surface 41b of the battery 41 with the magnetic sheet 401 therebetween. The power reception coil 400 is disposed to face a rear surface portion 210 of the apparatus case 20. There is a spacing between the power reception coil 400 and the rear surface portion 210 of the apparatus case 20.

The charging device 5 is, for example, a charging stand with a magnet. In the case 50 of the charging device 5, a magnetic sheet 51 is provided to face a mounting portion 151 of the case 50, on which the electronic apparatus 2 is mounted. The magnetic sheet 51 has a first main surface 51a that faces the mounting portion 151 of the case 50 and a second main surface 51b opposite the first main surface 51a. The power transmission coil 500 is mounted on the first main surface 51a of the magnetic sheet 51. The power transmission coil 500 is disposed to face the mounting portion 151 of the case 50. There is a spacing between the power transmission coil 500 and the mounting portion 151 of the case 50. In a space at a central portion of the power transmission coil 500 is disposed a magnet 52. Specifically, the power transmission coil 500 is disposed so as to surround the magnet 52. The magnet 52 is mounted on the magnetic sheet 51.

When the electronic apparatus 2 is mounted on the mounting surface 150 such that the rear surface 200 of the apparatus case 20 of the electronic apparatus 2 contacts the mounting surface 150 of the case 50 of the charging device 5, the power reception coil 400 faces the power transmission coil 500. In this state, the power transmission coil 500 is energized, and the power transmission coil 500 generates a magnetic flux, so that the magnetic flux is interlinked with the power reception coil 400. As a result, the power reception coil 400 generates an induced electromotive force. That is, the power reception coil 400 receives the electric power supplied from the power transmission coil 500. In the charge processing module 40 of the electronic apparatus 2, the battery 41 is charged on the basis of the induced electromotive force generated in the power reception coil 400. Such contactless charging is referred to as "electromagnetic induction charging."

The magnetic sheet 401 provided in the electronic apparatus 2 and the magnetic sheet 51 provided in the charging device 5 can suppress a leak of a magnetic flux passing through the power reception coil 400 and the power transmission coil 500 to the outside. This improves the electric power transmission efficiency (also referred to as "electric power feeding efficiency") in the transmission of the electric power from the charging device 5 to the electronic apparatus 2.

Although the electronic apparatus 2 is provided with no magnet, some electronic apparatuses adaptable for contactless power reception are provided with a magnet. When such an electronic apparatus is charged by the charging device 5, the magnet on the electronic apparatus side and the magnet 52 on the charging device 5 side attract each other, so that the power reception coil on the electronic apparatus side and the power transmission coil 500 on the charging device 5 side are aligned so as to appropriately face each other. This suppresses a reduction in electric power transmission efficiency due to a misalignment between the power reception coil and the power transmission coil 500.

<Basic Operation of Electronic Apparatus System in Contactless Charging>

The following describes a basic operation of the electronic apparatus system 1 in contactless charging. Description is made here assuming that the charging connector 430 is not supplied with the external power.

When the electronic apparatus 2 is mounted on the charging device 5 as illustrated in FIG. 6, the power reception processing module 410 of the electronic apparatus 2 and the charging device 5 start communication. As a result of the communication between the power reception processing module 410 and the charging device 5, initialization for contactless charging is performed between the electronic apparatus 2 and the charging device 5.

In the initialization, for example, an electric power transmission frequency to be used between the electronic apparatus 2 and the charging device 5 is decided. In the electronic apparatus system 1, a plurality of types of frequencies available for electric power transmission are determined. As a result of the communication between the electronic apparatus 2 and the charging device 5, a frequency at which the electric power transmission efficiency is maximized is identified from among the plurality of types of frequencies. The identified frequency serves as an electric power transmission frequency. In initialization, the electronic apparatus 2 notifies the charging device 5 of the electric power required for charging itself.

After the completion of the initialization, the charging device 5 transmits the electric power required for charging the electronic apparatus 2 from the power transmission coil 500. In the electronic apparatus 2, the DC voltage generation module 420 of the power reception processing module 410 generates a DC voltage 425 on the basis of the electric power received from the power transmission coil 500 by the power reception coil 400, and then outputs the DC voltage 425 to the charge controller 450.

In the charge controller 450, the selection module 460 selects the DC voltage 425 from the DC voltage generation module 420 and then outputs the DC voltage 425 to the charging module 470. When the DC voltage 425 is greater than the first threshold, the charging module 470 charges the battery 41 on the basis of the DC voltage 425. Meanwhile, when the DC voltage 425 is smaller than the second threshold, the charging module 470 does not charge the battery 41. The first threshold and the second threshold may be identical to or different from each other. When the DC voltage 425 is equal to or greater than the first threshold, the charging module 470 may charge the battery 41 on the basis of the DC voltage 425. When the DC voltage 425 is equal to or smaller than the second threshold, the charging module 470 may not charge the battery 41.

When charging the battery 41, the charging module 470 first operates in a constant current output mode. That is, the charging module 470 generates a constant charging current Ic on the basis of the DC voltage 425 and supplies the charging current Ic to the battery 41, thereby charging the battery 41. In other words, the charging module 470 charges the battery 41 on the basis of the DC voltage 425 such that the charging current Ic flowing through the battery 41 is constant. Then, when the voltage of the battery 41 is greater than a third threshold, the charging module 470 operates in the constant voltage output mode. That is, the charging module 470 generates a constant output voltage on the basis of the DC voltage 425 and supplies the output voltage to the battery 41, thereby charging the battery 41. After that, when the charging current Ic flowing through the battery 41 is smaller than a fourth threshold, the charging module 470 ends charging of the battery 41. Hereinafter, unless otherwise noted, the charging current Ic means a constant charging current Ic supplied from the charging module 470 to the battery 41 in the constant current output mode.

The controller 30 sets the charging current Ic. In other words, the controller 30 functions as a setting module that sets a charging current Ic. The controller 30 can set a value of the charging current Ic from among a plurality of types of current values. The controller 30 sets a value of the charging current Ic from among, for example, 200 mA, 400 mA, 600 mA, and 800 mA.

When charging of the battery 41 is started and then continues for a predetermined period of time or more, the state determination module 480 determines that the battery 41 is being charged. That is, the state determination module 480 does not determine that the battery 41 is being charged immediately after the start of charging the battery 41. When the charging current Ic flowing through the battery 41 is smaller than the fourth threshold, the state determination module 480 determines that the battery 41 is fully charged. When the charging module 470 does not charge the battery 41, the state determination module 480 determines that the battery 41 is being discharged. Until the charging module 470 starts charging the battery 41 and the state determination module 480 determines that the battery 41 is being charged, that is, until charging of the battery 41 continues for a predetermined period of time or more, the state determination module 480 determines that the battery 41 is being discharged. Thus, the state determination module 480 determines that the battery 41 is being discharged immediately after the start of charging the battery 41.

When the battery 41 is provided with a temperature sensor, the state determination module 480 may determine an abnormal temperature of the battery 41 on the basis of an output signal of the temperature sensor.

As described above, in the electronic apparatus 2, the battery 41 is charged on the basis of the electric power transmitted from the charging device 5.

<Charging Operation of Electronic Apparatus with Scarce Supplied Electric Power>

Although the example above has described the charging device 5 with a built-in magnet, there are various types of charging devices 5. For example, from the perspective of the approach for alignment of a power transmission coil and a power reception coil, there are moving-coil charging devices 5, coil-array charging devices 5, and other types of charging devices 5, in addition to the charging devices 5 with a built-in magnet.

In the moving-coil charging device 5, the position of the power reception coil 400 of the electronic apparatus 2 is detected, and on the basis of the detection result, the power transmission coil 500 moves so as to properly face the power reception coil 400. This results in an appropriate positional relationship between the power reception coil 400 and the power transmission coil 500 even when the electronic apparatus 2 is mounted on any portion of the mounting surface 150 of the charging device 5.

In the coil-array charging device 5, a plurality of power transmission coils 500 are arranged in array. In the coil-array charging device 5, the power transmission coils 500 are arranged so as to partially overlap their surrounding power transmission coils 500. In such a charging device 5, if the electronic apparatus 2 is mounted on any portion of the mounting surface 150 of the charging device 5, the power reception coil 400 can appropriately receive the electric power from the power transmission coil 500 closest to itself.

In the charging device 5, not only does the approach for alignment of the power transmission coil 500 and the power reception coil 400 vary, but also the size of the power transmission coil 500, the characteristics of the power transmission coil 500, the position of the power transmission coil 500, or the like may vary. Further, for the charging device 5 including the magnetic sheet 51, the thickness, characteristics, or the like of the magnetic sheet 51 may vary.

As described above, the charging devices 5 come in various types from the perspective of the approach for alignment of the power transmission coil 500 and the power reception coil 400, the characteristics of the power transmission coil 500, and the like. This may result in, depending on a charging device 5 to be used, an insufficient amount of electric power is supplied to the electronic apparatus 2 from the charging device 5. Conceivable causes that reduce the electric power received by the electronic apparatus 2 from the charging device 5 are as follows. Hereinafter, the coupling between the power reception coil 400 and the power transmission coil 500 may be referred to as "intercoil coupling."

For example, depending on the type of a charging device 5 to be used, the distance between the power reception coil 400 and the power transmission coil 500 may be large, with the electronic apparatus 2 mounted on the charging device 5.

In this case, the intercoil coupling weakens, reducing the electric power received by the electronic apparatus 2 from the charging device 5. When the power reception coil 400 is mounted on the battery 41, the distance between the power reception coil 400 and the power transmission coil 500 with the electronic apparatus 2 mounted on the charging device 5 is greater than that when the power reception coil 400 is mounted on the inner surface of the rear surface portion 210 of the apparatus case 20. Thus, intercoil coupling may weaken depending on the type of a charging device 5 to be used.

If the power reception coil 400 and the power transmission coil 500 are misaligned with the electronic apparatus 2 mounted on the charging device 5, intercoil coupling weakens, reducing the electric power received by the electronic apparatus 2 from the charging device 5. For example, in the use of the coil-array charging device 5, the electronic apparatus 2 may be mounted on the charging device 5 such that the power reception coil 400 faces the overlaps of a plurality of power transmission coils 500. In this case, the power reception coil 400 is weakly coupled to each of the plurality of power transmission coils 500.

The size of the power reception coil 400 may differ from the size of the power transmission coil 500 depending on the type of a charging device 5 to be used. In this case, intercoil coupling weakens, reducing the electric power received by the electronic apparatus 2 from the charging device 5. When the size of the power reception coil 400 is reduced due to the downsizing of the electronic apparatus 2, the size of the power reception coil 400 may be highly likely to differ from the size of the power transmission coil 500, resulting in weakened intercoil coupling.

In the magnetic saturation of the magnetic sheet 401 of the electronic apparatus 2, intercoil coupling weakens, reducing the electric power received by the electronic apparatus 2 from the charging device 5. For example, when the magnetic sheet 401 is thinner due to the downsizing of the electronic apparatus 2, the magnetic sheet 401 is more prone to magnetic saturation. This results in weakened intercoil coupling. In the use of a charging device 5 with a built-in magnet, the magnetic sheet 401 is prone to magnetic saturation due to the effect of the magnet. This results in weakened intercoil coupling.

In the electronic apparatus system 1, to increase electric power transmission efficiency, each of the power reception coil 400 and the power transmission coil 500 may be connected with a capacitor, and each of the electronic apparatus 2 and the charging device 5 may be provided with a resonant circuit. In this case, depending on the type of a charging device 5, the resonant circuit on the electronic apparatus 2 side and the resonant circuit on the charging device 5 side may have inappropriate impedance matching. This reduces the electric power received by the electronic apparatus 2 from the charging device 5.

As described above, there is compatibility between a charging device 5 to be used and the electronic apparatus 2, and depending on a charging device 5 to be used, the charging device 5 may not supply a sufficient amount of electric power to the electronic apparatus 2. In the electronic apparatus 2, when the charging device 5 does not supply a sufficient amount of electric power, the battery 41 may not be charged stably on the basis of the electric power. This is described below in detail.

In the electronic apparatus 2, upon supply of the electric power required for charging from the charging device 5, the DC voltage 425 output from the power reception processing module 410 is greater than the first threshold, so that the charging module 470 starts charging the battery 41. When the charging current Ic is set to a large value (for example, 800 mA), upon start of charging the battery 41, the output current of the DC voltage generation module 420 increases rapidly. In this case, when the charging device 5 supplies a sufficient amount of electric power to the electronic apparatus 2, that is, when the power reception coil 400 receives a sufficient amount of electric power, the output voltage of the DC voltage generation module 420, that is, the DC voltage 425 does not drop that much. When the charging device 5 supplies a sufficient amount of electric power to the electronic apparatus 2, accordingly, the DC voltage 425 is not smaller than the second threshold, thereby allowing the charging module 470 to continuously charge the battery 41 after starting charging the battery 41.

Meanwhile, when the charging device 5 insufficiently supplies the electric power to the electronic apparatus 2, a rapid increase in the output current of the DC voltage generation module 420 at the start of charging the battery 41 may significantly reduce the DC voltage 425 being an output voltage of the DC voltage generation module 420, resulting in the DC voltage 425 smaller than the second threshold. In this case, the DC voltage 425 is smaller than the second threshold immediately after the start of charging the battery 41, and accordingly, the charging module 470 stops charging the battery 41. When charging of the battery 41 is stopped, the DC voltage 425 rises to be greater than the first threshold. This causes the charging module 470 to restart charging the battery 41, so that the output current of the DC voltage generation module 420 abruptly increases again. As a result, the DC voltage 425 drops to be smaller than the second threshold, so that charging of the battery 41 is stopped. Thereafter, charging is repeatedly stopped and restarted.

Depending on the electric power supplied from the charging device 5 to the electronic apparatus 2, even when the charging current Ic is set to a value smaller than 800 mA, the DC voltage 425 may be smaller than the second threshold at the start of charging.

As described above, in the initialization between the electronic apparatus 2 and the charging device 5, a frequency at which electric power transmission efficiency is maximized is decided as the electric power transmission frequency. However, when charging of the battery 41 starts so that the output current of the DC voltage generation module 420 increases, the frequency at which electric power transmission efficiency is maximized may vary, reducing the electric power transmission efficiency at the electric power transmission frequency. In this case, the electric power supplied from the charging device 5 to the electronic apparatus 2 may decrease in charging, so that charging is repeatedly stopped and restarted.

As described above, depending on the type of a charging device 5 to be used, the electric power supplied from the charging device 5 to the electronic apparatus 2 may not be sufficient. In this case, charging may be repeatedly started and stopped in the electronic apparatus 2, so that the battery 41 is not charged stably.

The electronic apparatus 2 therefore performs a charging process capable of stably charging the battery 41 irrespective of the type of a charging device 5. The following describes the charging process in detail.

<Details of Charging Process>

Figure 7:
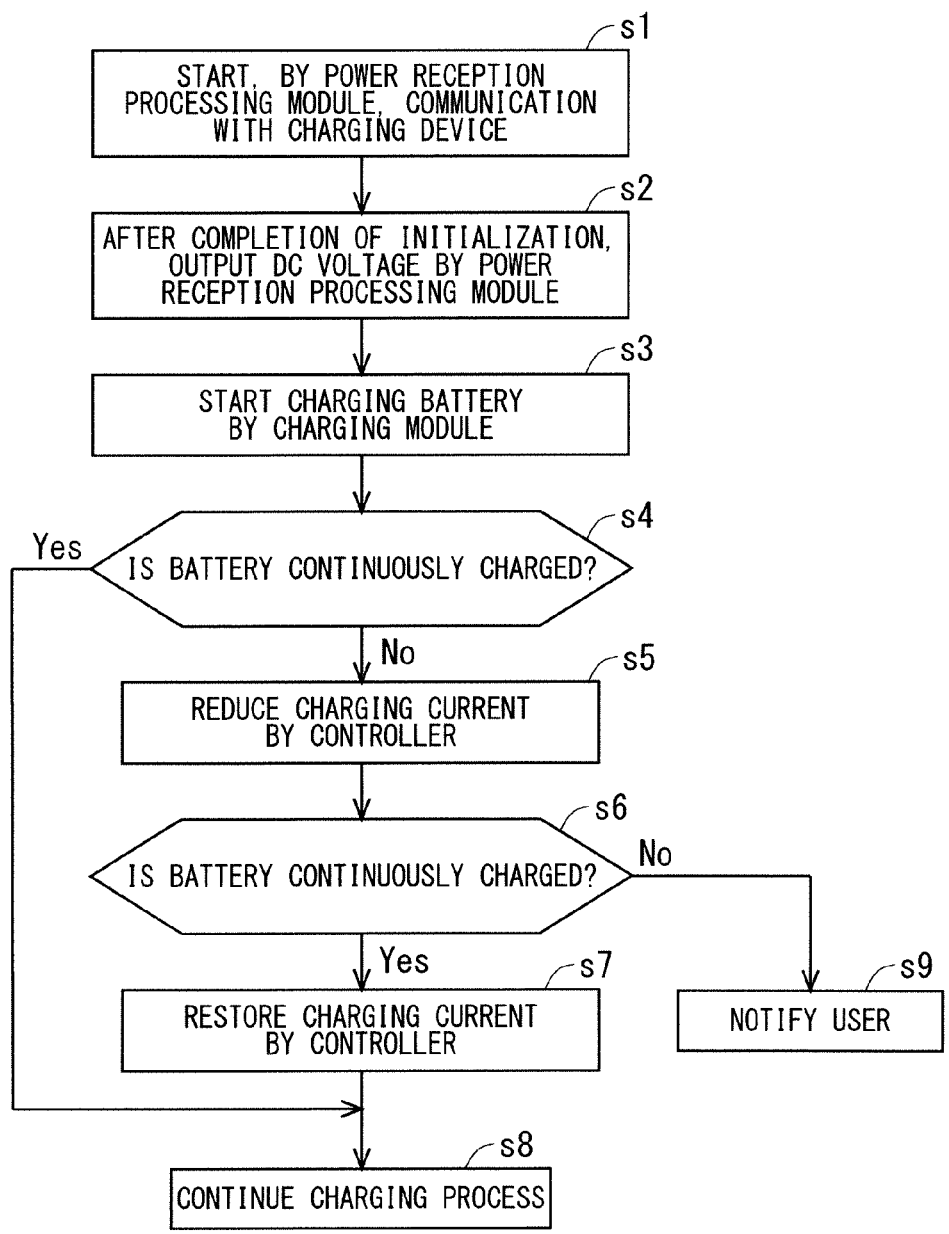
FIG. 7 illustrates a flowchart showing an operation of the electronic apparatus.

FIG. 7 illustrates a flowchart showing the charging process in the electronic apparatus 2. When the electronic apparatus 2 is mounted on the charging device 5, in Step s1, the power reception processing module 410 starts communication with the charging device 5. After starting communication with the charging device 5, the power reception processing module 410 outputs a communication start signal to the controller 30. The communication start signal is input to, for example, an interrupt terminal of the CPU 300 of the controller 30. Upon receipt of the communication start signal, the controller 30 recognizes that the electronic apparatus 2 is placed on the charging device 5. Upon input of the communication start signal to the interrupt terminal, the CPU 300 of the controller 30 executes interrupt processing of starting measuring a predetermined period of time. The predetermined period of time is set to, for example, several seconds to several tens of seconds.

When the initialization between the electronic apparatus 2 and the charging device 5 completes, and then, the power transmission coil 500 starts supplying the electronic apparatus 2 with the electric power required for charging the battery 41, in Step s2, the power reception processing module 410 generates the DC voltage 425 on the basis of the electric power received by the power reception coil 400 and then outputs the DC voltage 425. When the DC voltage 425 is greater than the first threshold, in Step s3, the charging module 470 starts charging the battery 41. The charging current Ic in this time is set to, for example, 800 mA.

After Step s3, after the completion of measuring a predetermined period of time in the CPU 300, that is, after a lapse of a predetermined period of time from the receipt of the communication start signal, in Step s4, the controller 30 determines whether the battery 41 is continuously charged. Specifically, the controller 30 checks the determination result of the charging state in the state determination module 480. When the state determination module 480 determines that the battery 41 is being charged, the controller 30 determines that the battery 41 is continuously charged. When the state determination module 480 determines that the battery 41 is being discharged, meanwhile, the controller 30 determines that the battery 41 is not continuously charged.

As described above, after charging of the battery 41 starts and continues for a predetermined period of time or more, the state determination module 480 determines that the battery 41 is being charged. Thus, when the state determination module 480 determines that the battery 41 is being charged after the start of charging the battery 41, it can be determined that the battery 41 is continuously charged. Meanwhile, when charging of the battery 41 is stopped immediately after the start of charging the battery 41, the state determination module 480 does not determine that the battery 41 is being charged but determines that the battery 41 is being discharged. When the state determination module 480 determines that the battery 41 is being discharged after the start of charging the battery 41, accordingly, it can be determined that charging is repeatedly stopped and restarted and the battery 41 is not continuously charged.

In this manner, the controller 30 functions as a determination module that determines whether the battery 41 is continuously charged. The initialization between the electronic apparatus 2 and the charging device 5 completes within a second, and thus, measuring of a predetermined period of time in the controller 30 completes after a while from the start of charging the battery 41. In other words, Step s4 is executed after a while from the start of charging the battery 41.

When determining that the battery 41 is continuously charged, the controller 30 particularly does not control the charging module 470 but causes the charging module 470 to continue the charging process (Step s8). Meanwhile, when determining that the battery 41 is not continuously charged, the controller 30 reduces the charging current Ic in Step s5. For example, the controller 30 reduces the charging current Ic from 800 mA to 200 mA.

After Step s5, in Step s6, the controller 30 determines again whether the battery 41 is continuously charged as in Step s4. When determining that the battery 41 is continuously charged, in Step s7, the controller 30 restores the charging current Ic. Specifically, the controller 30 changes the charging current Ic from 200 mA to 800 mA. In this case, the controller 30 may restore the charging current Ic after a lapse of a predetermined period of time from the determination that the battery 41 is continuously charged. After that, the controller 30 causes the charging module 470 to continue the charging process (Step s8).

Although the charging module 470 has started charging the battery 41 in Step s3, when it is not determined in Step s4 that the battery 41 is continuously charged, the electric power supplied from the charging device 5 may be insufficient, and charging may be highly likely to be repeatedly stopped and restarted.

When it is determined in Step s4 that the battery 41 is not continuously charged, as described above, the charging current Ic is reduced in Step s5. This suppresses a rapid increase in the output current of the DC voltage generation module 420, thereby suppressing a drop in the DC voltage 425 due to the insufficient amount of electric power supplied from the charging device 5. Thus, even when the electric power supplied from the charging device 5 is not sufficient, a situation in which the DC voltage 425 is smaller than the second threshold at the restart of charging after Step s5 can be suppressed. This suppresses a situation in which charging is repeatedly stopped and restarted for a long period of time.

FIG. 8 illustrates an output current and an output voltage of the DC voltage generation module 420 at the start of charging (at the restart of charging). The upper graphs of FIG. 8 illustrate a time variance in the output current of the DC voltage generation module 420, and the lower graphs of FIG. 8 illustrate a time variance in the output voltage of the DC voltage generation module 420. In FIG. 8, the graphs of solid lines illustrate an output current and an output voltage of the DC voltage generation module 420 when the charging current Ic is set to 200 mA, and the graphs of dashed lines illustrate an output current and an output voltage of the DC voltage generation module 420 when the charging current Ic is set to 800 mA.

As illustrated in FIG. 8, when charging is started (restarted) with the charging current Ic set to 800 mA, if the electric power supplied from the charging device 5 is not sufficient, the output voltage of the DC voltage generation module 420, that is, the DC voltage 425 may be smaller than the second threshold. When the DC voltage 425 is smaller than the second threshold, charging is stopped. Upon stop of charging, as illustrated in FIG. 8, the DC voltage 425 rises to be greater than the first threshold, so that charging is restarted. After the restart of charging, the output current of the DC voltage generation module 420 abruptly rises again. As a result, the DC voltage 425 drops to be smaller than the second threshold, so that charging is stopped. Thereafter, charging is repeatedly stopped and restarted.

Meanwhile, when charging is started (restarted) with the charging current Ic set to 200 mA, as illustrated in FIG. 8, the output current of the DC voltage generation module 420 does not increase abruptly. Thus, even when the electric power supplied from the charging device 5 is not sufficient, a situation in which the DC voltage 425 is smaller than the second threshold can be suppressed. This can suppress a situation in which charging is repeatedly stopped and restarted.

As described above, when it is determined that the battery 41 is not continuously charged after the charging module 470 starts charging the battery 41, the controller 30 reduces the charging current Ic, thereby suppressing a situation in which charging is repeatedly stopped and restarted for a long period of time. Consequently, the electronic apparatus 2 can stably charge the battery 41.

When it is determined that the battery 41 is continuously charged after the charging module 470 starts charging the battery 41, the charging current Ic does not decrease. Thus, when the electric power supplied from the charging device 5 is sufficient, the battery 41 can be charged with a large charging current Ic. This reduces a charging time, that is, a time from when charging of the battery 41 starts to when the battery 41 is fully charged.

As described above, when the output current of the DC voltage generation module 420 changes abruptly, the DC voltage 425 is highly likely to be smaller than the second threshold. Therefore, if an abrupt change in the output current of the DC voltage generation module 420 can be suppressed, a situation in which the DC voltage 425 is smaller than the second threshold can be suppressed. For example, when the charging current Ic is changed from 200 mA to 800 mA, an abrupt change in the output current of the DC voltage generation module 420 can be suppressed more than when charging is started with the charging current Ic set to 800 mA, that is, when the charging current Ic is changed from 0 mA to 800 mA. Meanwhile, when charging of the battery 41 is continued by the reduced charging current Ic after the execution of Step s5, a charging time of the battery 41 becomes longer.

Therefore, after the charging current Ic is reduced in Step s5, in Step s6, the controller 30 determines again whether the battery 41 is continuously charged as in Step s4. When determining that the battery 41 is continuously charged, in Step s7, the controller 30 restores the charging current Ic. In other words, the controller 30 changes the charging current Ic from 200 mA to 800 mA. After that, the controller 30 causes the charging module 470 to continue the charging process (Step s8). This suppresses a situation in which the battery 41 is permanently charged with the charging current Ic kept small. As a result, a charging time can be reduced.

FIG. 9 illustrates an output current and an output voltage of the DC voltage generation module 420. The upper graphs of FIG. 9 illustrate a time variance in the output current of the DC voltage generation module 420, and the lower graphs of FIG. 9 illustrate a time variance in the output voltage of the DC voltage generation module 420. In FIG. 9, the graphs of solid lines illustrate an output current and an output voltage of the DC voltage generation module 420 when the charging current Ic is changed from 200 mA to 800 mA, and the graphs of dashed lines illustrate an output current and an output voltage of the DC voltage generation module 420 when the charging current Ic is changed from 0 mA to 800 mA.

As illustrated in FIG. 9, when the charging current Ic is changed from 200 mA to 800 mA, a situation in which the output current of the DC voltage generation module 420 changes abruptly can be suppressed, thereby suppressing a situation in which the DC voltage 425 is smaller than the second threshold.

When the controller 30 determines that the battery 41 is not continuously charged in Step s6, in Step s9, the electronic apparatus 2 makes a predetermined notification to the user. In Step s9, for example, the display panel 32 performs a predetermined display, so that a predetermined notification is made to the user. In Step s9, the display panel 32 displays, for example, the information for notifying that charging is unstable. Examples of such information include the information that urges the rearrangement of the electronic apparatus 2 on the charging device 5 and the information that urges the removal of the protective cover attached to the apparatus case 20 of the electronic apparatus 2. In Step s9, for the display panel 32 to perform a predetermined display, the display panel 32 may display characters or figures. In Step s9, in addition to or in place of a predetermined display performed by the display panel 32, the external speaker 36 may output a predetermined sound so that a predetermined notification is made to the user.

When the battery 41 is not continuously charged even after the charging current Ic is reduced in Step s5, in other words, when charging is repeatedly stopped and restarted, it is conceivable that the electric power supplied from the charging device 5 may be considerably scarce. In this case, making a predetermined notification to the user as described above can urge the user to improve the coupling between the power reception coil 400 and the power transmission coil 500.

As described above, in the electronic apparatus 2, when it is determined that the battery 41 is not continuously charged after the start of charging the battery 41, the charging current Ic is reduced. Thus, even when the electric power supplied from the charging device 5 to the electronic apparatus 2 is not sufficient due to the compatibility between a charging device 5 to be used and the electronic apparatus 2, the battery 41 can be charged stably. That is, the electronic apparatus 2 can charge the battery 41 stably irrespective of the type of a charging device 5 to be used.

Initially setting the charging current Ic small without any change can suppress a situation in which charging is repeatedly stopped and restarted. In this case, unfortunately, a charging time becomes longer irrespective of the type of a charging device 5 to be used, that is, irrespective of the electric power supplied from the charging device 5. Additionally, setting the charging current Ic small at the start of charging and then gradually increasing the charging current Ic can suppress a rapid increase in the output current of the DC voltage generation module 420, thereby suppressing a situation in which charging is repeatedly stopped and restarted. In this case, unfortunately, the charging current Ic at the start of charging is small irrespective of the type of a charging device 5 to be used. Thus, a charging time becomes longer irrespective of the type of a charging device 5 to be used. Further, when the charging device 5 supplies a sufficient amount of electric power, gradually increasing the charging current Ic is unnecessary control. In the electronic apparatus 2, when it is determined that the battery 41 is continuously charged after the start of charging the battery 41, the charging current Ic is kept without being reduced, thereby suppressing a situation in which a charging time becomes longer when the charging device 5 supplies a sufficient amount of electric power. Further, when the charging device 5 supplies a sufficient amount of electric power, the execution of unnecessary control is suppressed.

When it is determined that the battery 41 is continuously charged after a reduction in the charging current Ic, the charging current Ic is restored. This suppresses a situation in which the battery 41 is permanently charged with a small charging current Ic. Thus, even when the electric power supplied from the charging device 5 is not sufficient, a charging time can be reduced.

Although the electronic apparatus 2 is a mobile phone such as a smartphone in the example above, it may be any other apparatus having a chargeable battery, such as a tablet terminal or a music player.

Although the charging current Ic is restored when it is determined that the battery 41 is continuously charged after a reduction in the charging current Ic, the charging current Ic may not be restored.

The charging current Ic at the start of charging is 800 mA in the example above, which is not limited thereto. Additionally, the charging current Ic after being reduced is 200 mA, which is not limited thereto.

If the electronic apparatus 2 is poorly compatible with a charging device 5 to be used and the electric power supplied from the charging device 5 is small, the DC voltage 425 may be smaller than the second threshold even when the charging current Ic changes from 200 mA to 800 mA. In such a case, when the charging current Ic is immediately restored upon the determination that the battery 41 is continuously charged after a reduction in the charging current Ic, the DC voltage 425 may be smaller than the second threshold, thereby stopping charging of the battery 41. Thus, immediately restoring the charging current Ic in Step s7 may lead to a situation in which charging is repeatedly restarted and stopped.

In Step s7, therefore, the controller 30 may perform a process of gradually restoring the charging current Ic. In other words, the controller 30 may gradually increase the reduced charging current Ic. For example, the controller 30 first changes the charging current Ic from 200 mA to 400 mA. The controller 30 sets the charging current Ic to 600 mA after a lapse of a predetermined period of time from the setting of the charging current Ic to 400 mA. Then, the controller 30 sets the charging current Ic to 800 mA after a lapse of a predetermined period of time from the setting of the charging current Ic to 600 mA.

As described above, in Step s7, gradually restoring the charging current Ic further suppresses a rapid increase in the output current of the DC voltage generation module 420. This suppresses a situation in which charging is repeatedly restarted and stopped every time the charging current Ic is restored. As a result, the battery 41 can be charged stably.

The controller 30 may determine whether the battery 41 is continuously charged every time the charging current Ic is restored by one level. For example, the controller 30 determines whether the battery 41 is continuously charged after changing the charging current Ic from 200 mA to 400 mA. The controller 30 sets the charging current Ic to 600 mA when determining that the battery 41 is continuously charged. Meanwhile, the controller 30 restores the charging current Ic to 200 mA when determining that the battery 41 is not continuously charged. The controller 30 determines whether the battery 41 is continuously charged after changing the charging current Ic from 400 mA to 600 mA. The controller 30 sets the charging current Ic to 800 mA when determining that the battery 41 is continuously charged. Meanwhile, the controller 30 restores the charging current Ic to 400 mA when determining that the battery 41 is not continuously charged.

Figure 10:
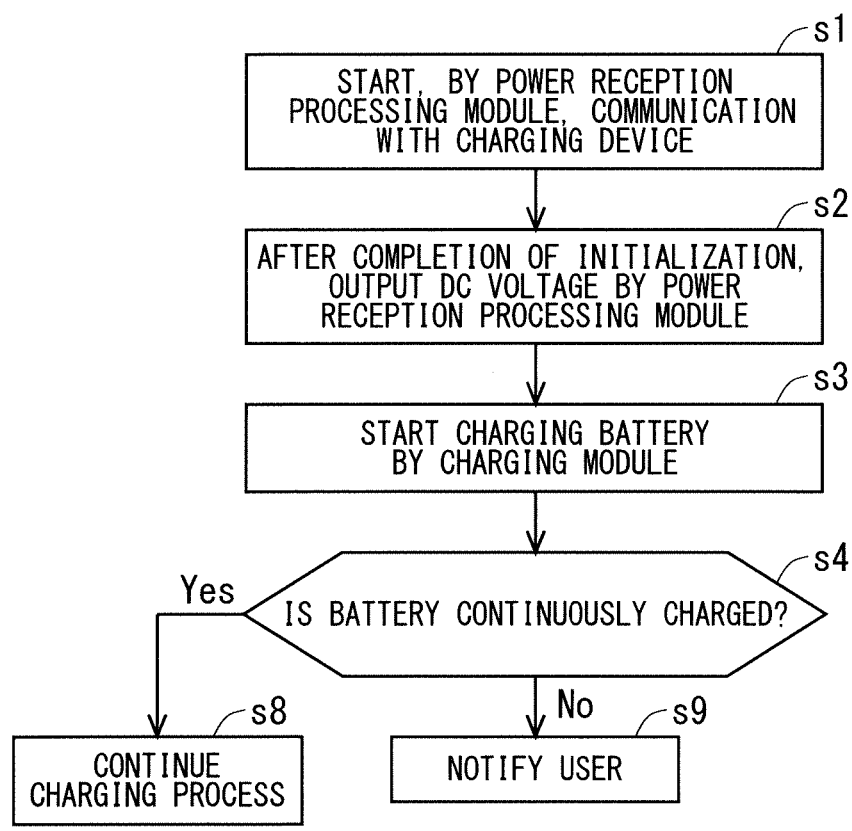
FIG. 10 illustrates a flowchart showing an operation of the electronic apparatus.

When it is determined in Step s4 that the battery 41 is not continuously charged, as illustrated in FIG. 10, the electronic apparatus 2 may not reduce the charging current Ic but may perform Step s9 to make a predetermined notification to the user. In this case, the coupling between the power reception coil 400 and the power transmission coil 500 can be improved by the user rearranging the electronic apparatus 2 on the charging device 5 or removing the protective cover attached to the apparatus case 20 of the electronic apparatus 2. Then, the electronic apparatus 2 executes Steps s1 to s4 again.

While the electronic apparatus system 1 has been shown and described in detail, the foregoing description is in all aspects illustrative and not restrictive. Also, the variations are applicable in combination as long as they are consistent with each other. It is therefore understood that numerous modifications and variations can be devised without departing from the scope of the disclosure.

The invention claimed is:

1. An electronic apparatus, comprising:
a battery;
a charge processing module configured to charge the battery on the basis of electric power transmitted contactlessly from a contactless charging device, wherein the charge processing module includes
a power reception coil configured to receive electric power supplied from a power transmission coil of the contactless charging device,
a generation module configured to generate a DC voltage on the basis of the electric power received by the power reception coil, and
a charging module configured to charge the battery on the basis of the DC voltage when the DC voltage supplied from the generation module is equal to or greater than a first threshold or is greater than the first threshold, and configured not to charge the battery when the DC voltage is equal to or smaller than a second threshold or is smaller than the second threshold; and
at least one controller configured to
set a constant charging current to be supplied by the charging module to the battery, and,
after a predetermined period of time following the setting of the constant charging current,
determine whether or not the battery has been continuously charged over the predetermined period of time at the set constant charging current, and,
when the battery has not been continuously charged over the predetermined period of time at the set charging current, reduce the constant charging current to be supplied by the charging module to the battery.

2. The electronic apparatus according to claim 1, wherein the at least one controller is configured to, after a second predetermined period of time following the reduction in the constant charging current,
determine whether or not the battery has been continuously charged over the second predetermined period of time at the reduced constant charging current, and,
when the battery has been continuously charged over the second predetermined period of time at the reduced constant charging current, restore the constant charging current to the set constant charging current.

3. The electronic apparatus according to claim 2, wherein restoring the constant charging current to the set constant charging current comprises gradually increasing the constant charging current from the reduced constant charging current to the set constant charging current.

4. The electronic apparatus according to claim 2, wherein the at least one controller is configured to, after the second predetermined period of time following the reduction in the constant charging current, when the battery has not been continuously charged over the second predetermined period of time at the reduced constant charging current, notify a user.

5. The electronic apparatus according to claim 4, further comprising a display, wherein the notification to the user comprises a predetermined indication on the display.

6. The electronic apparatus according to claim 1, wherein the power reception coil is mounted on the battery.

7. A charging method of charging, by an electronic apparatus including a battery, the battery on the basis of electric power transmitted contactlessly from a contactless charging device, the charging method comprising:
receiving, by a power reception coil of the electronic apparatus, electric power from a power transmission coil of the contactless charging device;
generating a DC voltage on the basis of the electric power received by the power reception coil;
charging the battery on the basis of the DC voltage when the DC voltage is equal to or greater than a first threshold or is greater than the first threshold;
not charging the battery when the DC voltage is equal to or smaller than a second threshold or is smaller than the second threshold;
setting a constant charging current to be supplied to the battery; and,
after a predetermined period of time following the setting of the constant charging current,
determining whether or not the battery has been continuously charged over the predetermined period of time at the set constant charging current, and,
when the battery has not been continuously charged over the predetermined period of time at the set constant charging current, reducing the constant charging current to be supplied to the battery.

* * * * *